(12) United States Patent
Alvanos et al.

(10) Patent No.: US 8,517,666 B2
(45) Date of Patent: Aug. 27, 2013

(54) TURBINE COOLING AIR SEALING

(75) Inventors: Ioannis Alvanos, Springfield, MA (US); Rajendra K. Agrawal, South Windsor, CT (US); Hector M. Pinero, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1229 days.

(21) Appl. No.: 11/224,613

(22) Filed: Sep. 12, 2005

(65) Prior Publication Data
US 2007/0059158 A1  Mar. 15, 2007

(51) Int. Cl.
*F01D 5/08* (2006.01)
*F01D 5/18* (2006.01)

(52) U.S. Cl.
USPC ...... 415/115; 415/116; 415/173.7; 415/174.4; 415/174.5; 416/95; 416/96 R; 416/220 R

(58) Field of Classification Search
USPC .............. 415/115, 116, 173.7, 174.4, 174.5; 416/95, 96 R, 97 R, 220 R
See application file for complete search history.

(56) References Cited

U.S. PATENT DOCUMENTS

| 2,988,325 | A |   | 6/1961  | Dawson |         |
|-----------|---|---|---------|--------|---------|
| 3,565,545 | A | * | 2/1971  | Bobo et al. | 415/115 |
| 3,832,090 | A |   | 8/1974  | Matto |         |
| 4,425,079 | A | * | 1/1984  | Speak et al. | 415/139 |
| 4,701,105 | A |   | 10/1987 | Cantor et al. |   |
| 4,822,244 | A | * | 4/1989  | Maier et al. | 416/95 |
| 5,088,892 | A |   | 2/1992  | Weingold et al. |   |
| 5,310,319 | A |   | 5/1994  | Grant et al. |   |
| 5,358,374 | A | * | 10/1994 | Correia et al. | 415/115 |
| 5,402,636 | A | * | 4/1995  | Mize et al. | 415/115 |
| 5,403,156 | A | * | 4/1995  | Arness et al. | 416/96 R |
| 5,522,698 | A |   | 6/1996  | Butler et al. |   |
| 6,551,056 | B2 |  | 4/2003  | Rau |         |
| 6,595,741 | B2 | * | 7/2003  | Briesenick et al. | 415/116 |
| 6,776,573 | B2 | * | 8/2004  | Arilla et al. | 415/115 |
| 6,857,847 | B2 | * | 2/2005  | Iacopetti | 415/115 |
| 7,025,562 | B2 | * | 4/2006  | Imbourg et al. | 415/115 |
| 7,048,497 | B2 | * | 5/2006  | Arilla et al. | 415/116 |

FOREIGN PATENT DOCUMENTS

| EP | 1111189 A2 | 6/2001 |
| GB | 2184167 A  | 6/1987 |
| JP | 46-28059   | 8/1971 |
| JP | 57-116102 A | 7/1982 |

(Continued)

OTHER PUBLICATIONS

Japanese Office Action for JP2006-241405, dated Feb. 24, 2009.

(Continued)

*Primary Examiner* — Christopher Verdier
(74) *Attorney, Agent, or Firm* — Bachman & LaPointe, P.C.

(57) ABSTRACT

A turbine engine section has a stationary vane stage and a rotating blade stage. The blade stage is spaced from the vane stage to form an annular chamber therebetween. A manifold delivers a pressurized fluid to the chamber. An outer diameter (OD) sealing system restricts leakage of the pressurized fluid from the chamber. An inner diameter (ID) sealing system restricts leakage of the pressurized fluid from the chamber. A flow guide extends radially between the inner diameter sealing system and the manifold. The flow guide bisects the chamber to form a stationary chamber portion and a rotating chamber portion, the rotating chamber portion at least partially along a disk of the first blade stage.

31 Claims, 7 Drawing Sheets

(56) References Cited

FOREIGN PATENT DOCUMENTS

| | | |
|---|---|---|
| JP | 9-512607 A | 12/1997 |
| JP | 11-036802 A | 2/1999 |
| JP | 2003-343206 A | 12/2003 |
| JP | 2004-245224 A | 9/2004 |
| JP | 2005-508470 A | 3/2005 |

OTHER PUBLICATIONS

European Search Report for EP Patent Application No. 06254738.5, dated Nov. 5, 2010.

European Office action for EP Patent Application No. 06254738.5, dated Dec. 10, 2012.

* cited by examiner

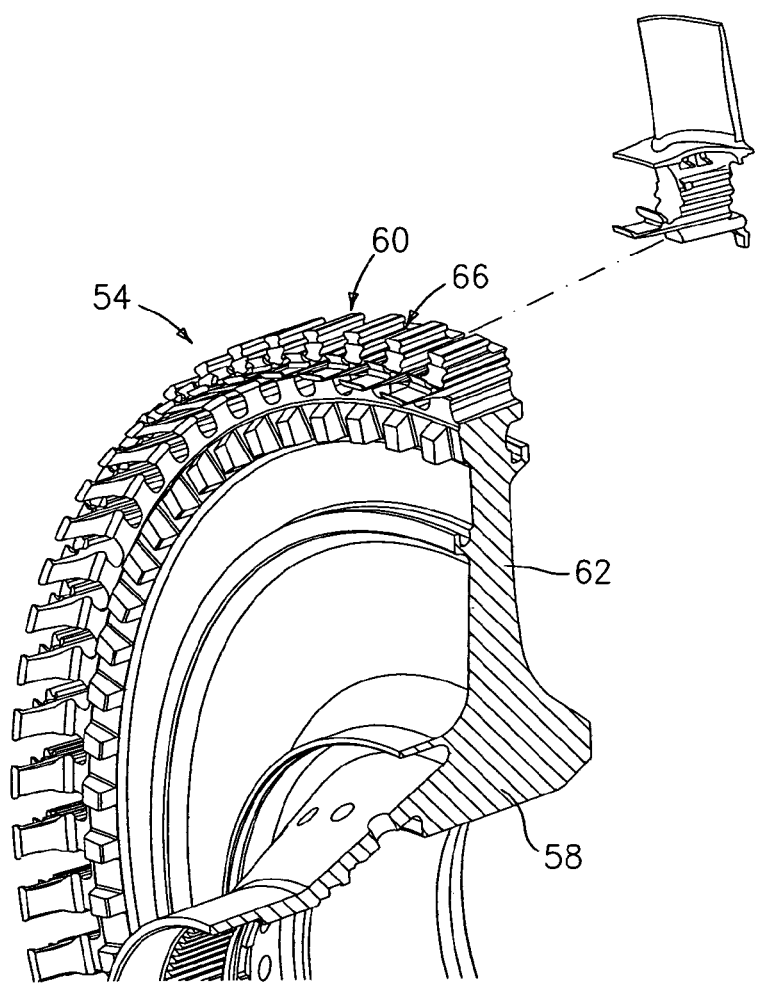
FIG. 3
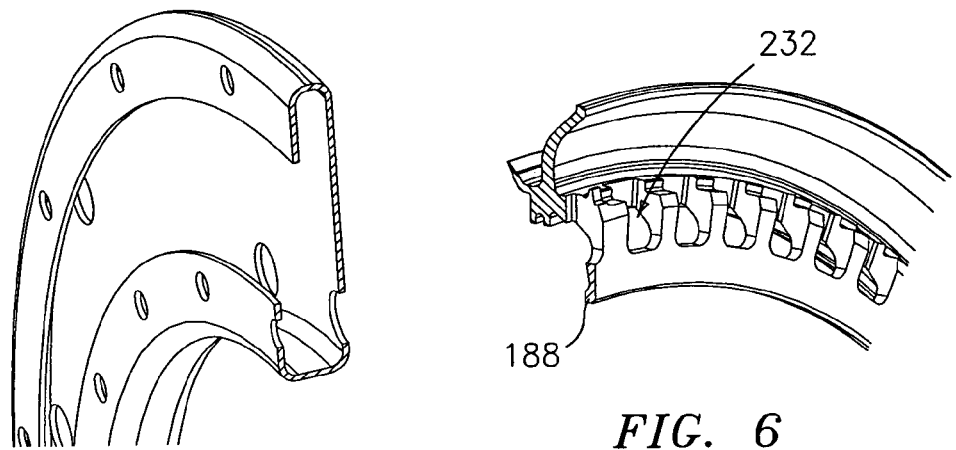
FIG. 5
FIG. 6

TURBINE COOLING AIR SEALING

BACKGROUND OF THE INVENTION

The invention relates to gas turbine engines, and more specifically to a seal system for providing a fluid leakage restriction between components within such engines.

Gas turbine engines operate by burning a combustible fuel-air mixture in a combustor and converting the energy of combustion into a propulsive force. Combustion gases are directed axially rearward from the combustor through an annular duct, interacting with a plurality of turbine blade stages disposed within the duct. The blades transfer the combustion gas energy to one or more disks, rotationally disposed about a central, longitudinal axis of the engine. In a typical turbine section, there are multiple, alternating stages of stationary vanes and rotating blades disposed in the annular duct.

Because the combustion gas temperature may reach 2000° F. or more, some blade and vane stages are cooled with lower temperature cooling air for improved durability. Air for cooling the first-stage blades bypasses the combustor and is directed to an inner diameter cavity located between a first-stage vane frame and a first-stage rotor assembly. The rotational force of the rotor assembly pumps the cooling air radially outward and into a series of conduits within each blade, thus providing the required cooling.

Because the outboard radius of the inner cavity is adjacent to the annular duct carrying the combustion gases, it must be sealed to prevent leakage of the pressurized cooling air. This area of the inner cavity is particularly challenging to seal, due to the differences in thermal and centrifugal growth between the stationary first-stage vane frame and the rotating first stage rotor assembly. In the past, designers have attempted to seal the outboard radius of inner cavities with varying degrees of success.

An example of such a seal is disclosed in U.S. Pat. No. 4,701,105, issued to Cantor and Farrand and entitled "Anti-Rotation Feature for a Turbine Rotor Faceplate". In this example, a multi-step labyrinth seal separates the inner cavity into two regions of approximately equal size, an inner region and an outer region. Cooling air in the inner region is pumped between the rotating disk and labyrinth seal into the hollow conduits of the blades while the outer region is fluidly coupled to the annular duct carrying the combustion gases. A labyrinth seal's lands are typically pre-grooved to prevent interference between the knife-edge teeth and the lands during a maximum radial excursion of the rotor. By designing the labyrinth seal for the maximum radial excursion of the rotor assembly, the leakage restriction capability is reduced during low to intermediate radial excursions of the rotor assembly. Any cooling air that leaks by the labyrinth seal is pumped through the outer region and into the annular duct by the rotating disk. This pumping action increases the temperature of the disk in the area of the blades and creates parasitic drag, which reduces overall turbine efficiency. The rotating knife-edges also add additional rotational mass to the gas turbine engine, which further reduces engine efficiency.

Another example of such a seal is disclosed in U.S. Pat. No. 5,310,319, issued to Grant and Hoyt and entitled "Free Standing Turbine Disk Sideplate Assembly" and U.S. Pat. No. 5,522,698, issued to Butler and Gernhardt and entitled "Brush Seal Support and Vane Assembly Windage Cover". As this example illustrates, a brush seal separates the inner cavity into two regions, an inner region and a smaller, outer region. A freestanding sideplate assembly defines a disk cavity, which is in fluid communication with the inner region. Cooling air in the inner region enters the disk cavity and is pumped between the rotating sideplate and disk to the hollow conduits of the blades. The seal's bristle-to-land contact pressure increases during the maximum radial excursions of the rotor and may cause the bristles to deflect and set over time, reducing the leakage restriction capability during low to intermediate rotor excursions. Any cooling air that leaks by the brush seal is pumped into the outer region by the rotating disk. This pumping action increases the temperature of the disk in the area of the blades and creates parasitic drag, which reduces overall turbine efficiency. The freestanding sideplate and minidisk also adds rotational mass to the gas turbine engine, which further reduces engine efficiency.

Copending U.S. patent application Ser. No. 11/146,801 entitled "Hammerhead Seal" (applicant reference number EH-11279), Ser. No. 11/146,798 entitled "Combined Blade Attachment and Disk Lug Fluid Seal" (applicant reference number EH-11598), and Ser. No. 11/146,660 entitled "Blade Neck Fluid Seal" (applicant reference number EH-11507), all filed Jun. 7, 2005, disclose improved sealing systems. The disclosures of these applications are incorporated by reference herein as if set forth at length.

SUMMARY OF THE INVENTION

One aspect of the invention involves a turbine engine section having a stationary vane stage and a rotating blade stage. The blade stage is spaced from the vane stage to form an annular chamber therebetween. A manifold delivers a pressurized fluid to the chamber. An outer diameter (OD) sealing means restricts leakage of the pressurized fluid from the chamber. An inner diameter (ID) sealing means restricts leakage of the pressurized fluid from the chamber. A baffle or flow guide extends radially between the inner diameter sealing means and the manifold. The flow guide bisects the chamber to form a stationary chamber portion and a rotating chamber portion, the rotating chamber portion at least partially along a disk of the first blade stage.

In various implementations, the OD sealing means may comprise a cover plate attached to the disk. The flow guide may be affixed to at least one of the manifold or ID seal with a bolted joint. The stationary chamber portion may be bounded by the manifold, the flow guide, and a seal land of the ID seal. The manifold may be affixed to the vane stage. The rotating chamber portion may be at least partially along a web of the disk.

Another aspect of the invention involves a gas turbine engine with a cover plate mounted to an upstream side of a first disk of a turbine rotor stack. A cooling air outlet is positioned to direct cooling air to a region adjacent the first disk. The first disk has a perimeter array of slots. Blades in a first blade stage each have an inboard attachment portion received in an associated slot. The cover plate has a first portion engaging the first disk to retain the cover plate against movement away from the first disk. The cover plate has a second portion, outboard of the first portion and engaging the blades of the first blade stage to resist upstream movement of the blades. The cover plate has a sealing portion for engaging a sealing element inboard of a first stator vane stage. A flow guide extends between the cooling air outlet and an inboard seal with the rotor.

In various implementations, the cover plate may have a radial span between an inner radius and perimeter radius. A ratio of the radial span to a hub radius at the first blade stage may be no more than 0.25, more narrowly 0.20. The cooling air outlet may have a characteristic radius from central longitudinal axis of the rotor. A ratio of the characteristic radius to a hub radius at the first blade stage may be no less than 0.60, more narrowly 0.70. The engagement may be via a locking ring. The cooling outlet may be a tangential on-board injector.

Another aspect of the invention involves a gas turbine engine. The cooling air outlet is positioned to direct air to a region adjacent a first disk of a turbine rotor stack. At least one of: a first portion of the cooling air is directed radially outward and between the first blade stage and a first stator vane stage into a core flowpath; and a second portion of the cooling air is directed radially inward and to an inboard seal. The engine includes means for limiting vorticity of at least one of the first portion and the second portion. The turbine further comprises a cover plate mounted to an upstream side of the first disk. The cover plate has a first portion engaging the first disk to retain the cover plate against moving away from the first disk. The cover plate has a second portion outboard of the first portion and engaging the blades of the first blade stage to resist upstream movement of the blade stage. The cover plate has a sealing portion for engaging a seal element inboard of the first stator vane stage.

Another aspect of the invention involves a gas turbine engine having a sealing system between first and second disks of a turbine rotor stack. The system includes a non-rotating first body secured inboard of a platform structure of an intermediate stage of stator vanes. The first body carries at least one abradable land. The first disk carries at least one first runner sealingly engaging the at least one land. The second disk carries at least one second runner sealingly engaging the at least one land.

In various implementations, the first disk may be an upstream-most disk. There may be a plurality of such first runners on a first cover plate and a plurality of such second runners on a second cover plate. The sealing system may transmit substantially no longitudinal force and torque between the first and second disks. The sealing system may be bore-less.

Other aspects of the invention include methods of reengineering. For example, a gas turbine engine may be reengineered from a baseline configuration to a reengineered configuration. The reengineering may decrease a radial span of a cover plate while removing an inboard sealing portion of the cover plate and shifting a cooling air outlet outboard. The reengineering may further include adding a flow guide along a path of an air stream from the outlet.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 3 is a cutaway view of a first stage disk with turbine blades exploded off for illustration.

FIG. 5 is a cutaway view of a flow guide baffle of the system of FIG. 2.

FIG. 6 is a cutaway view of a cover plate of the system of FIG. 2.

Like reference numbers and designations in the various drawings indicate like elements.

DETAILED DESCRIPTION

Figure 1:
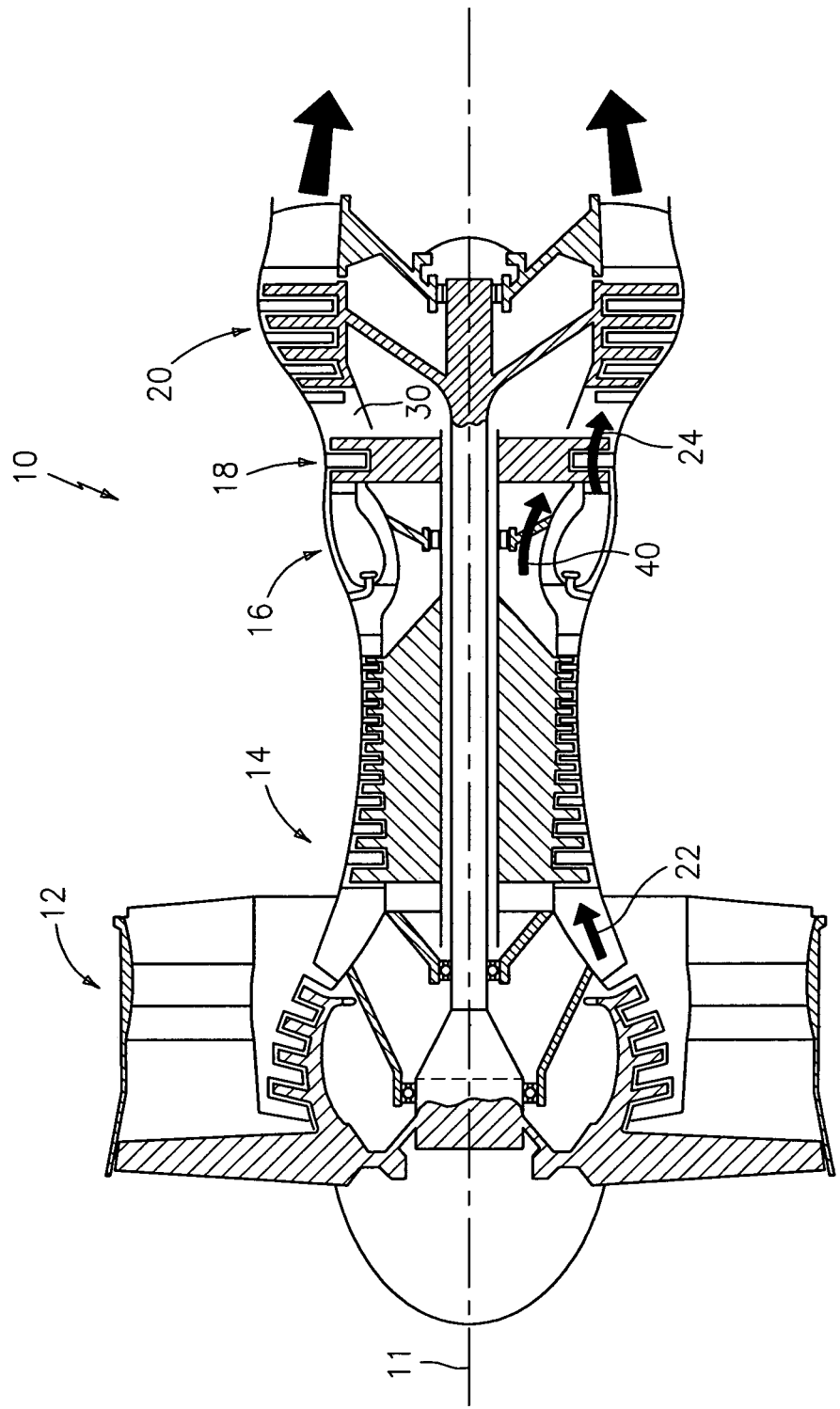
FIG. 1 is a simplified schematic sectional view of a gas turbine engine along a central, longitudinal axis.

The major sections of a typical gas turbine engine 10 of FIG. 1 include in series, from front to rear and disposed about a central longitudinal axis 11, a low-pressure compressor 12, a high-pressure compressor 14, a combustor 16, a high-pressure turbine module 18 and a low-pressure turbine module 20. A working fluid 22 is directed generally downstream/rearward through the compressors 12, 14 and into the combustor 16, where fuel is injected and the mixture is burned. Hot combustion gases 24 exit the combustor 16 and expand within a core flowpath in an annular duct 30 through the turbines 18, 20 and exit the engine 10 as a propulsive thrust. A portion of the working fluid 22 exiting the high-pressure compressor 14, bypasses the combustor 16 and is directed to the high-pressure turbine module 18 for use as cooling air 40.

Figure 2:
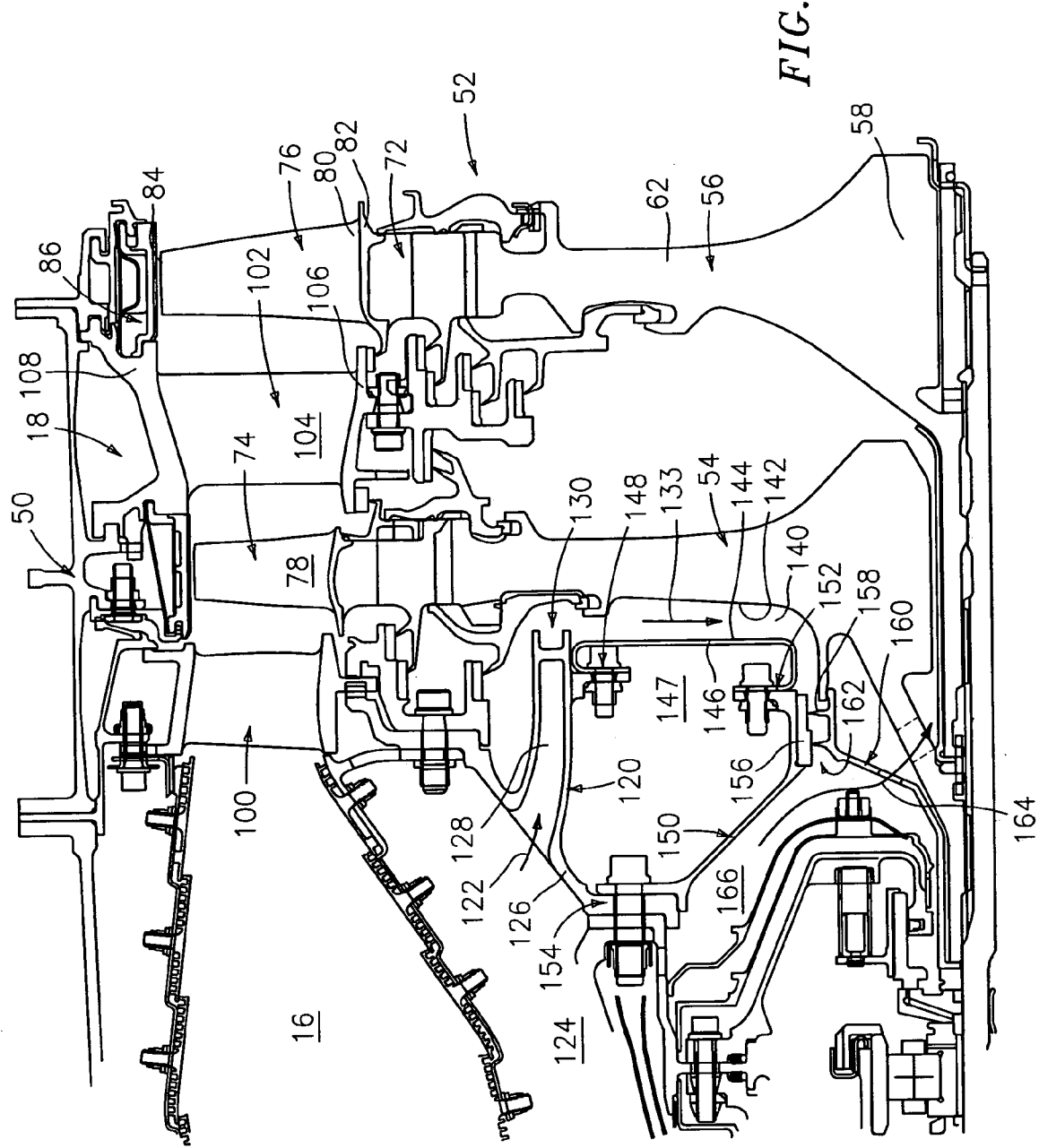
FIG. 2 is a partial longitudinal sectional view of turbine cooling system components of the engine of FIG. 1.
Figure 4:
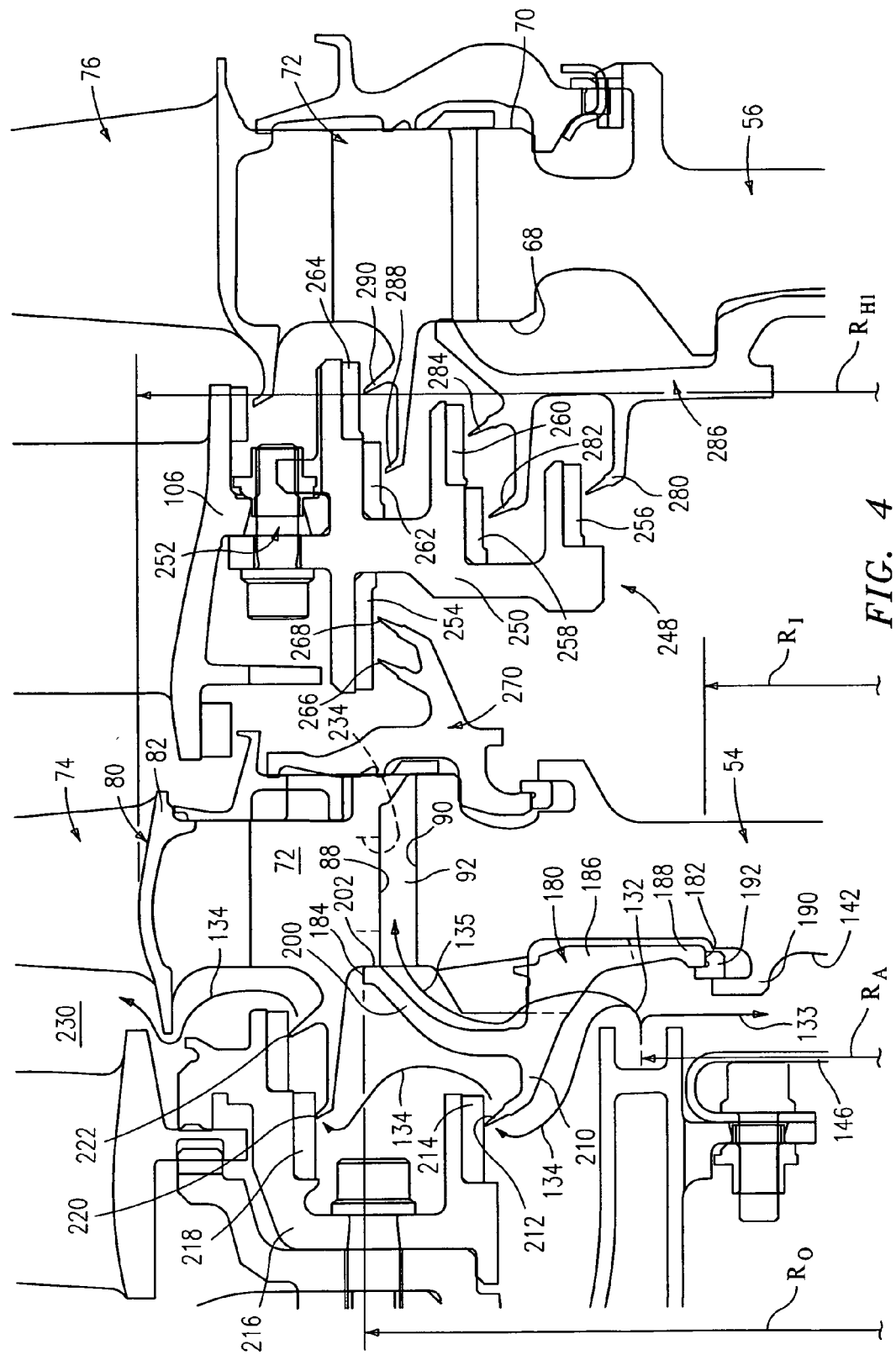
FIG. 4 is an enlarged view of the system of FIG. 2.

FIG. 2 shows further details of the interface between the downstream end of the combustor 16 and the upstream end of the high pressure turbine module 18. Within the engine case 50, the turbine module 18 includes a rotor assembly 52 including a stack of disks. An upstreammost first disk 54 is followed by a second disk 56. Additional disks (not shown) may follow. The exemplary disks extend from an inboard bore 58 to an outboard periphery 60 (FIG. 3). A web 62 extends between the bore 58 and the periphery 60. Extending radially inward from the periphery 60 are slots 66 forming a circumferential array. The slots 66 extend longitudinally, or near longitudinally, between faces 68 and 70 (FIG. 4) on respective upstream and downstream sides of the disks. The slots 66 have convoluted, so-called fir-tree, profiles for receiving generally complementary convoluted blade roots 72. FIG. 4 shows first stage blades 74 mounted to the first disk 54 and second stage blades 76 mounted to the second disk 56. The blades 74, 76 have airfoils 78 extending from roots 80 at platforms 82 to tips 84 (FIG. 2) in close facing proximity to outer air seal shrouds 86 carried by the case 50. The roots 72 (FIG. 4) depend from the platforms 82. In the exemplary engine, inboard ends 88 of the roots 72 are spaced radially outward from inboard ends 90 of the slots 66 so as to create associated passageways 92.

A number of vane stages are alternatingly interspersed with the blade stages. FIG. 2 shows a first stage of vanes 100 between the combustor 16 and the first stage of blades 74. A second stage of vanes 102 is shown between the first stage of blades 74 and the second stage of blades 76. The exemplary vanes 100, 102 have airfoils 104 extending between inboard platforms 106 and outboard shrouds 108. The exemplary shrouds 108 may be mounted to the case 50. Each stage of vanes may be formed as a continuous one-piece ring or may be formed as a segmented ring.

FIG. 2 shows further details of a tangential on-board injection (TOBI) cooling system 120 directing a portion 122 of the air 40 for turbine cooling. The air stream 122 is directed from a diffuser plenum 124 inboard of the combustor 16. The system 120 includes a manifold 126 having a circumferential array of conduits 128 ending in outlets 130. Exiting the outlets 130, the air stream 122 (FIG. 4) may split into portions 132 and 133 extending generally radially outward and inward, respectively. The air stream 132 promptly splits into streams 134 and 135.

The air stream 133 (FIG. 2) is directed into a chamber 140 between a forward/upstream face 142 of the web of the first stage disk on the one hand and the aft/downstream face 144 of a flow guide baffle 146 on the other hand. The flow guide baffle generally closes-off (but does not necessarily seal-off) a chamber 147 thereahead and inboard of the manifold 126. The chambers 140 and 147 may thus be regarded as portions of a larger chamber bisected by the flow guide baffle 146. The chamber 147 is a stationary chamber in that the surfaces bounding it are essentially non-rotating. The chamber 140 is a partially rotating chamber in that a nontrivial portion of the surfaces bounding it rotate with (e.g., are part of) the rotor. The exemplary flow guide baffle 146 has an outboard portion mounted to the manifold 128 at a junction 148 (e.g., a bolt circle or slip joint). An inboard portion of the baffle 146 (isolated in FIG. 5) is mounted to a seal carrier 150 at a junction 152 (e.g., a bolt circle or slip joint). A forward portion of the exemplary seal carrier 150 is mounted to the manifold 126 at a junction 154 (e.g., a bolt circle). The seal carrier 150 carries a land 156 of an abradable seal material (e.g., honeycomb or slip joint). The land 156 is engaged by one or more (e.g., two shown) knife-edge members or runners 158 on an inboard first air seal member 160 mounted to the first stage disk 54. The land(s) 156 and runners 158 thus form a sealing system 162. The stream 133 counters any leakage from a rotor cooling stream 164 directing compressor air from a plenum 166 ahead of the seal carrier 150 and the inboard first air seal member 160. The stream 133 may also cool the disk 54 along the surface 142. The baffle reduces the volume of the pressurized air scrubbing against the rotating disk and serves to guide adjacent air stream and avoid or limit creating regions of turbulence and vorticity. This encourages laminar flow and associated high heat transfer and limits lossed due to disk windage. The baffle shape closely corresponds to the shape of the structure (e.g., the forward surface of the disk 54) on the opposite side of the chamber 140.

FIG. 4 shows further details of the air streams 134 and 135. Both streams interact with a cover or face plate seal member 180 (hereafter "cover plate"). As is discussed below, the stream 134 flows around the cover plate and the stream 135 flows through the cover plate. The cover plate 180 extends from an inboard extremity 182 at a central opening to an outboard periphery 184. An inboard body portion 186 of the cover plate 180 serves to mount the cover plate 180 to the first stage disk 54. The mounting portion 186 extends radially outward from an inboard portion 188. The inboard portion 188 cooperates with an outwardly facing hook channel 190 on the forward/upstream face 142 of the first stage disk web. The cooperation is via a locking ring 192. The cooperation restrains forward/upstream movement of the cover plate 180 relative to the first stage disk.

As viewed in the cross-section of FIG. 4, a retention portion 200 of the cover plate 180 branches off from the outboard end of the body portion 186 and extends to the periphery 184. An aft/downstream rim portion 202 near the periphery engages the blade roots to prevent forward/upstream shifting of the blades within their associated slots. The exemplary cover plate 180 is normally under stress to provide sufficient retention bias. Accordingly, the portion 200 is arcuate in section to best accommodate the stress and associated strain. A sealing portion 210 also branches off forward of the portion 200 and extends to one or more runners 212. The runner 212 sealingly engages an abradable seal material land 214 carried by a first outboard under platform air seal member 216 mounted to the platform of the first vane stage. The seal member 216 also includes an abradable seal material land 218 engaging runners 220 and 222 of the combined blade platforms and the first stage disk (e.g., as also shown in Ser. No. 11/146,798).

The air stream 134 faces the combined sealing effects of the runners 212, 220, and 222 before passing between the platforms of the first vane and blade stages to enter the core flowpath 230. The stream 135 passes radially outward through apertures 232 (FIG. 6) in the cover plate 180. The apertures 232 may also serve to register the cover plate with anti-rotation lugs of the associated disk. Thereafter, the stream 135 passes between the cover plate portion 200 and the disk and enters the passageways 92. From the passageways 92, the stream 135 proceeds radially outward through a cooling passageway network 234 in each of the blades, ultimately exiting through fine cooling passageways (not shown) along the blade airfoil. The cooling passageway network 234 (passageways) are positioned to receive at least a portion of cooling air delivered to the region adjacent the associated disk.

Relative to various existing cooling air sealing configurations, the exemplary configuration may have one or more of several advantages. FIG. 4 shows the cover plate 180 as having an inboard radius $R_I$ and an outboard radius $R_O$ relative to the engine axis 11 which forms a rotational axis of the rotor. A radial span of the cover plate 180 is the difference between $R_O$ and $R_I$. FIG. 4 further shows a first stage hub radius $R_{H1}$ which is a peak radius of the first stage blade platforms 82. FIG. 4 further shows a characteristic radius $R_A$ of the cooling air outlets 130. This radius may be at a nominal radial center of the outlets, at a flow-average radius, or the like. The exemplary configuration of FIG. 4 may represent a reengineering of a baseline cooling air system configuration. The reengineering may shift $R_A$ outward. The reengineering may also decrease the cover plate radial span (e.g., at least one of absolutely and proportionally). An exemplary ratio of the cover plate radial span to $R_{H1}$ is about 0.185. An exemplary range for this ratio is up to 0.25, more narrowly up to 0.20. An exemplary ratio of $R_A$ to $R_{H1}$ is approximately 0.73. An exemplary range for this ratio is at least 0.70, more broadly at least 0.60.

Figure 7:
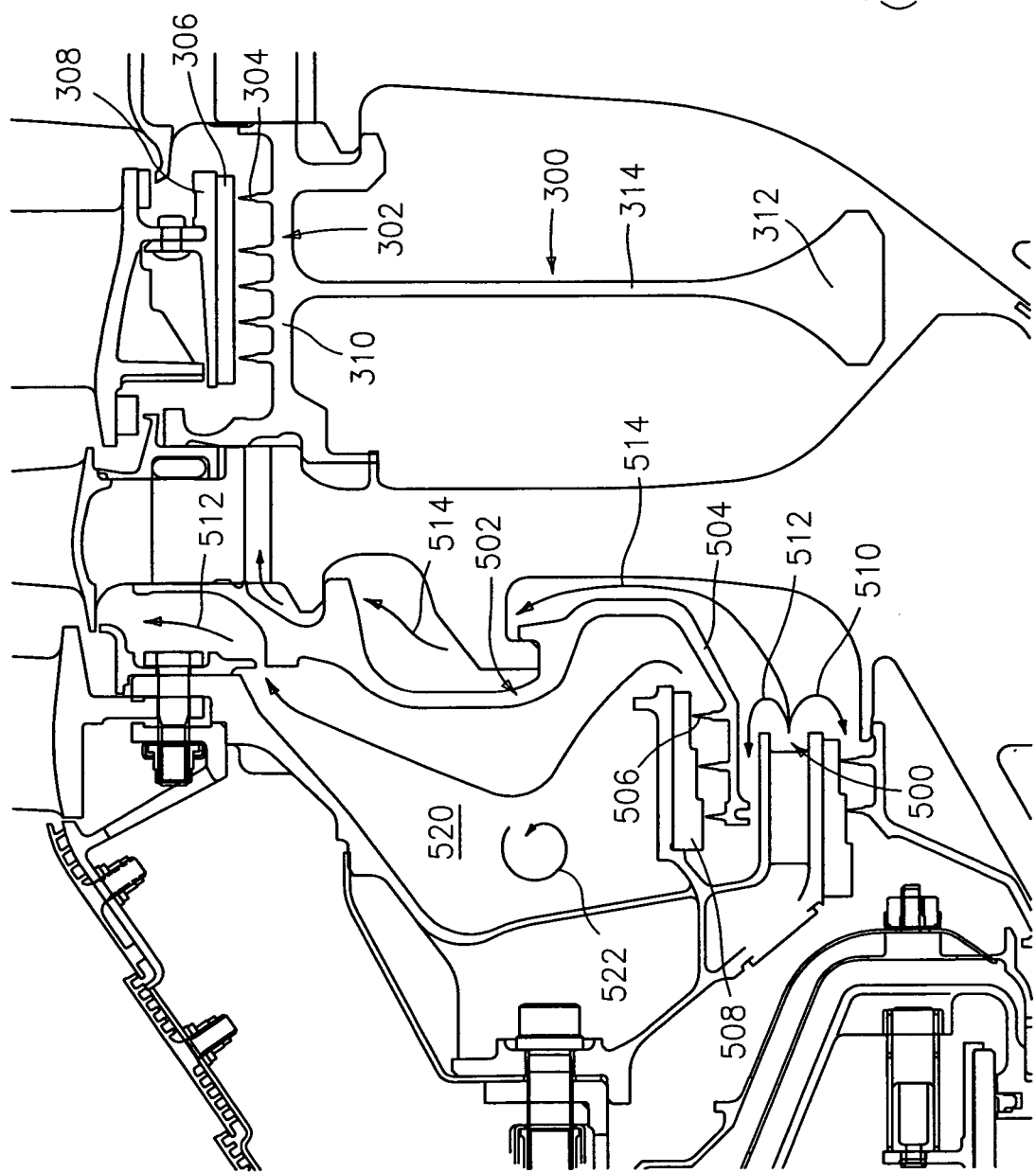
FIG. 7 is a view of a prior art cooling system.

For example, FIG. 7 shows corresponding portions of an exemplary baseline prior art engine. The prior art cooling air outlets 500 are relatively inboard. Additionally, the prior art cover plate 502 has a relatively large radial span with the presence of an inboard portion 504 carrying runners 506 for interacting with land(s) 508 just outboard of the TOBI conduits. The TOBI outlet stream is split into portions 510, 512, and 514, respectively generally analogous to the streams 133, 134, and 135. The stream 512 passes around the runners 506 and into a chamber 520 before ultimately passing to the core flowpath. The stream 514 passes between the cover plate portion 504 and the disk web before ultimately reaching the blades. This FIG. 7 configuration may present several inefficiencies. First, the stream 514 is heated as it passes between the cover plate portion 504 and disk web. This heating may be due to a combination of factors including heat transfer from the web and a centrifugal pumping effect. This reduces the blade cooling efficiency of the stream 514 requiring a greater flow rate to achieve a given blade cooling effect. Similar heating may occur to the stream 512. Additionally, generation of vorticity 522 in the cavity 520 may increase local heating of the surrounding hardware. High cooling air flow rates may compromise performance (e.g., power, efficiency, and/or emissions).

In the exemplary engine of FIGS. 2 and 4, the baffle 146 tends to close off the volume 147 (FIG. 2) thereahead and minimize the vortex heat pumping effect on the stream 133. The outward shift of the TOBI outlet minimizes heating of the stream 135. This allows cooler air to enter the blades. The sealing provided by the runners 212, 218, and 222 helps limit the flow rate of the stream 134 to help maintain proper engine performance. Relative to the FIG. 7 baseline, the reduced cover plate span is associated with reduced cover plate mass. Because this mass must be carried by the first disk, the mass reduction permits a reduction in the size (and therefore required mass) of the first disk. This may further increase engine performance, decrease engine mass, and the like.

FIG. 4 also shows details of an exemplary interstage sealing system 248 associated with the second vane stage. A non-rotating seal body 250 is secured inboard of the second vane stage platforms 106 by a junction 252 (e.g., a bolt circle). The body 250 may be a continuous or segmented annulus. In the example, the body carries an upstream abradable sealing land 254 and downstream abradable sealing lands 256, 258, 260, 262, and 264. The land 254 is positioned to sealingly engage runners 266 and 268 of a downstream cover plate 270 mounted to the downstream side of the first stage disk 54. The lands 256, 258, and 260 are positioned to engage runners 280, 282, and 284 of a cover plate 286 mounted to the forward/upstream side of the second stage disk 56. The lands 262 and 264 are positioned to engage runners 288 and 290 of the combined second stage disk and second stage blade sealing members (e.g., on or adjacent blade platforms). The cover plate 270 may be of similarly small radial span (if not smaller) to the cover plate 180. An exemplary ratio of the cover plate radial span to the first stage hub radius is 0.143 for the cover plate 270. An exemplary range for this ratio is up to 0.25, more narrowly up to 0.20, and yet more narrowly up to 0.16.

FIG. 7 shows a prior art interstage seal system 300 having a first body 302 from which a number of runners 304 extend. The first body structurally couples and rotates with the first and second stage disks. The runners 304 engage a land 306 carried by a non-rotating second body 308 mounted to the associated vane platforms. The first body 302 has a portion 310 spanning between peripheral portions of the adjacent disks and carrying the runners 304. For structural integrity, the second body 302 has a bore 312 coupled by a web 314 to the portion 310.

Relative to the prior art sealing system 300, the sealing system 248 of FIG. 4 may have one or more of several advantages. The system 248 substantially does not structurally couple the disks 54 and 56 (e.g., the forces and torques transmitted are only the minor forces and torques transmitted by runner-to-land interaction). This decoupling permits greater independence of mechanically-induced and thermally-induced movements or shape changes between the disks. The rotating mass and its inertia may also be reduced. For example, the mass and inertia of the rotating cover plates 270 and 286 may be less than that of the first body 302 reducing the dead load pull.

Figure 8:
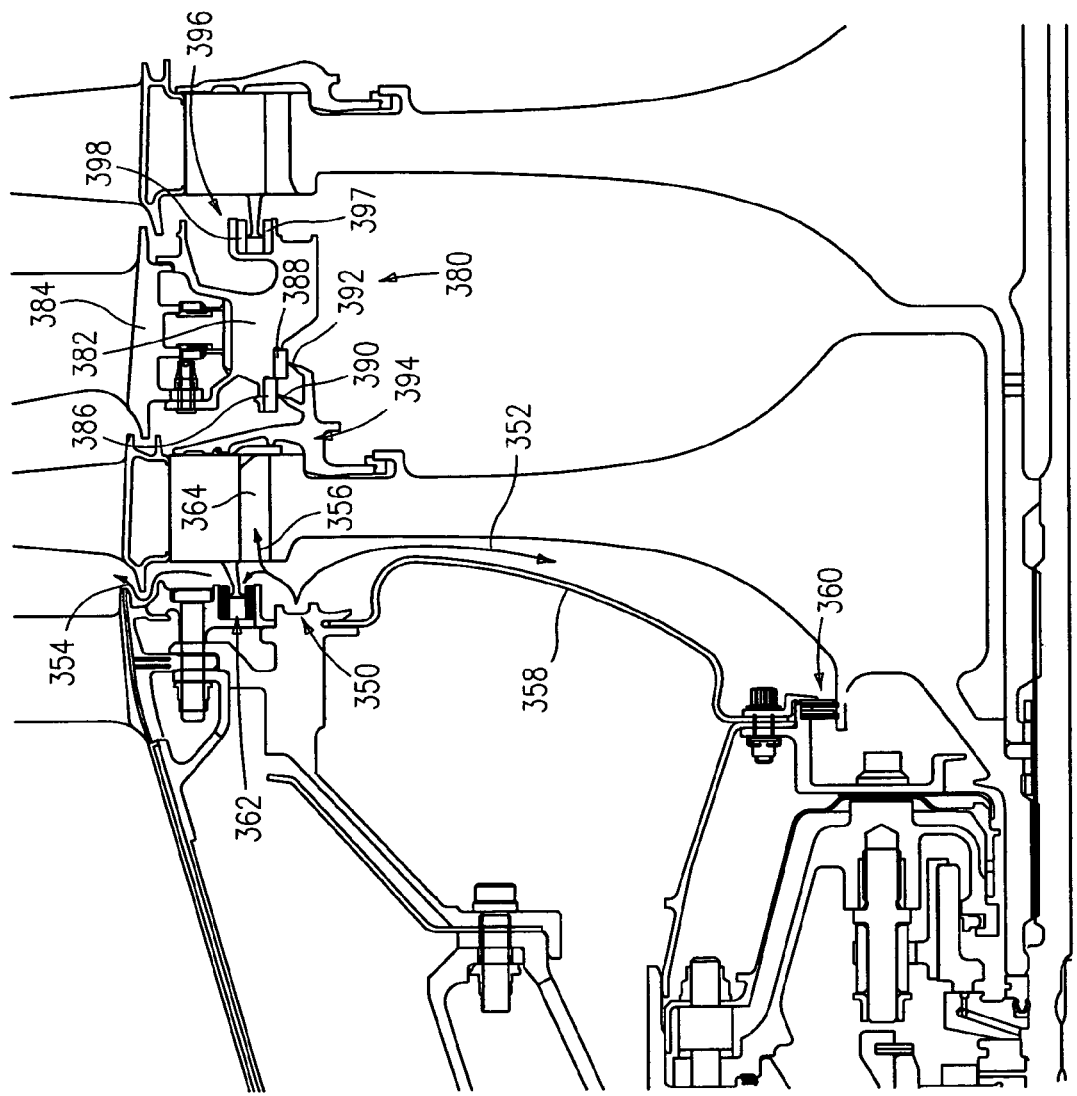
FIG. 8 is a partial longitudinal sectional view of an alternate turbine cooling system.

FIG. 8 shows an alternate implementation wherein the FIG. 4 forward/upstream cover plates on the first and second disks are eliminated. TOBI outlets 350 discharge cooling air streams 352, 354, and 356, respectively generally analogous to the streams 133, 134, and 135. The stream 352 passes between a baffle 358 and the first stage disk web to encounter a brush seal system 360. The stream 354 passes radially outward and encounters a hammerhead-type sealing system 362 (e.g., as is also disclosed in Ser. No. 11/146,801). The air stream 356 passes directly into the blade feed passageways 364. Similarly, an interstage sealing system 380 has a non-rotating first body 382 secured inboard of and to the second stage vane platforms 384. In an upstream sealing subsystem 385, lands 386 and 388, respectively seal with runners 390 and 392 of a cover plate 394 mounted to the first disk in similar fashion to that of FIG. 4. Sealing with the second disk is via a hammerhead-type sealing system 396. In each of the seals 362 and 396, inboard and outboard lands are spaced apart and facing each other to define a channel accommodating a runner pair of the adjacent disk and blade root combination.

Figure 9:
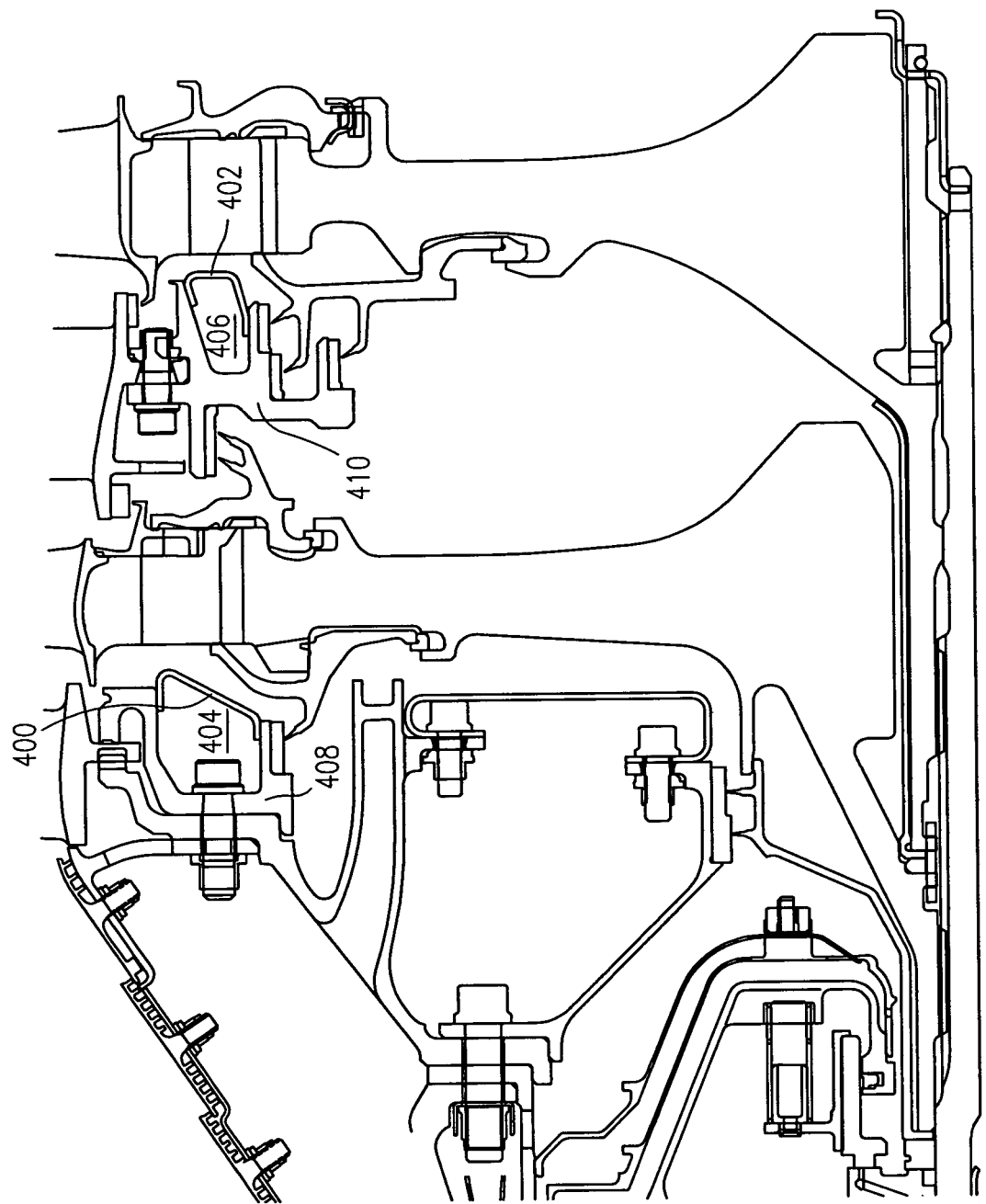
FIG. 9 is a partial longitudinal sectional view of a second alternate turbine cooling system.

FIG. 9 shows yet another alternate implementation wherein the FIG. 4 blade root seals are eliminated. The cover plate seals are maintained. The blade root seals are replaced by baffles 400 and 402, respectively isolating annular underplatform compartments in the associated seal bodies 408 and 410. As with the other baffles, the baffles 400 and 402 may have a generally C-sectioned, namely, generally forwardly-open C-shaped cross-section, and may be formed of sheet metal. The baffles may be secured by fasteners, rivets, or by a slip fit. The baffles may be substantially non-structural (e.g., adding essentially no strength to the associated static hardware but merely serving to influence adjacent air flow).

One or more embodiments of the present invention have been described. Nevertheless, it will be understood that various modifications may be made without departing from the spirit and scope of the invention. For example, when implemented in the remanufacturing or reengineering of a given engine or engine configuration, details of the existing engine or configuration may influence details of any particular implementation. Accordingly, other embodiments are within the scope of the following claims.

What is claimed is:

1. A turbine engine section comprising:
    a stationary vane stage;
    a rotating blade stage, said blade stage spaced from said vane stage to form an annular chamber therebetween;
    a manifold for delivering a pressurized fluid to the chamber;
    an outer diameter sealing means for restricting leakage of the pressurized fluid from said chamber;
    an inner diameter sealing means for restricting leakage of the pressurized fluid from said chamber, the inner diameter sealing means comprising an abradable seal material carried by a seal carrier; and
    a flow guide of generally forwardly open, C-shaped section extending radially between said inner diameter sealing means and said manifold, said flow guide bisecting said chamber to form a stationary chamber portion and a rotating chamber portion, the rotating chamber portion at least partially along a disk of the first blade stage, said flow guide mounted to said seal carrier and generally closing off the stationary chamber portion so that the surfaces bounding the stationary chamber portion are essentially non-rotating with the stationary chamber portion bounded by the manifold forward and outboard of the stationary chamber portion, the flow guide aft of the stationary chamber portion, and the seal carrier forward and inboard of the stationary chamber portion.

2. The engine section of claim 1 wherein said outer diameter sealing means comprises a cover plate attached to said disk.

3. The engine section of claim 2 wherein:
    the flow guide is non-structural and formed of sheet metal.

4. The engine section of claim 2 wherein said flow guide is affixed to said manifold with a first bolted joint and to said seal carrier with a second bolted joint.

5. The engine section of claim 4 wherein:
    the flow guide is non-structural and formed of sheet metal.

6. The engine section of claim 1 wherein the manifold is affixed to the vane stage.

7. The turbine engine section of claim 1 wherein the rotating chamber portion is at least partially along a web of the disk.

8. The engine section of claim 1 wherein:
the flow guide is non-structural and formed of sheet metal.

9. A turbine engine section comprising:
a stationary vane stage;
a rotating blade stage, said blade stage spaced from said vane stage to form an annular chamber therebetween;
a manifold for delivering a pressurized fluid to the chamber;
an outer diameter sealing means for restricting leakage of the pressurized fluid from said chamber;
an inner diameter sealing means for restricting leakage of the pressurized fluid from said chamber, the inner diameter sealing means comprising an abradable seal material carried by a seal carrier; and
a flow guide of generally forwardly open, C-shaped section extending radially between said inner diameter sealing means and said manifold, said flow guide bisecting said chamber to form a stationary chamber portion and a rotating chamber portion, the rotating chamber portion at least partially along a disk of the first blade stage, said flow guide mounted to said seal carrier and generally closing off the stationary chamber portion so that the surfaces bounding the stationary chamber portion are essentially non-rotating, wherein said flow guide is affixed to said manifold with a first bolted joint and to said seal carrier with a second bolted joint.

10. The engine section of claim 9 wherein:
the flow guide is non-structural and formed of sheet metal.

11. A gas turbine engine comprising:
a turbine rotor stack assembly comprising:
a plurality of disks; and
a plurality of stages of blades, each stage carried by an associated disk of the plurality of disks;
a plurality of stator vane stages, interspersed with the blade stages; and
a cover plate mounted to an upstream side of a first disk of the plurality of disks; and
a cooling air outlet positioned to direct cooling air to a region adjacent the first disk, wherein:
the first disk has a perimeter array of slots;
the blades of a first blade stage of the plurality of stages of blades each have an inboard attachment portion received in an associated slot of the slots;
the cover plate has a first portion engaging the first disk to retain the cover plate against movement away from the first disk;
the cover plate has a second portion, outboard of the first portion and engaging the blades of the first blade stage to resist upstream movement of said blades;
the cover plate has a sealing portion for engaging a seal element inboard of a first stator vane stage of said plurality of stator vane stages; and
a flow guide extends between the cooling air outlet and an inboard seal with the rotor.

12. The engine of claim 11 wherein:
the cover plate has radial span between an inner radius and perimeter radius; and
a ratio of said radial span to a hub radius at the first blade stage is no more than 0.25.

13. The engine of claim 11 wherein:
the cover plate has radial span between an inner radius and perimeter radius; and
a ratio of said radial span to a hub radius at the first blade stage is no more than 0.20.

14. The engine of claim 11 wherein:
the cooling air outlet has a characteristic radius from a central longitudinal axis of the rotor stack assembly; and
a ratio of said characteristic radius to a hub radius at the first blade stage is no less than 0.60.

15. The engine of claim 11 wherein:
the cooling air outlet has a characteristic radius from a central longitudinal axis of the rotor stack assembly; and
a ratio of said characteristic radius to a hub radius at the first blade stage is no less than 0.70.

16. The engine of claim 11 wherein:
the engagement of the cover plate first portion to the first disk is via a locking ring.

17. The engine of claim 11 wherein:
the cooling air outlet is a tangential on-board injector.

18. A gas turbine engine comprising:
a turbine rotor stack comprising:
a plurality of disks; and
a plurality of stages of blades, each stage carried by an associated disk of the plurality of disks;
a plurality of stator vane stages, interspersed with the blade stages; and
a cooling air outlet positioned to direct cooling air to a region adjacent a first disk, wherein:
the first disk of the plurality of disks has a perimeter array of slots;
the blades of a first blade stage of the plurality of stages of blades each have an inboard attachment portion received in an associated slot of the slots; and
at least one of:
a first portion of the cooling air is directed radially outward and between the first blade stage and a first of said stator vane stages into a core flowpath; and
a second portion of the cooling air is directed radially inward and to an inboard seal;
the engine includes means for limiting voracity of at least one of said first portion and said second portion;
the turbine further comprises a cover plate mounted to an upstream side of the first disk;
the cover plate has a first portion engaging the first disk to retain the cover plate against movement away from the first disk;
the cover plate has a second portion, outboard of the first portion and engaging the blades of the first blade stage to resist upstream movement of said blades; and
the cover plate has a sealing portion for engaging a seal element inboard of the first stator vane stage.

19. The engine of claim 18 wherein:
the cooling air outlet is a tangential on-board injector.

20. The engine of claim 18 wherein:
the means is positioned radially outboard of a seal, the seal being radially outboard of the outlet.

21. The engine of claim 18 wherein:
the means comprises an annular flow guide.

22. The engine of claim 21 wherein:
the flow guide reduces a volume of a chamber ahead of the first disk;
the flow guide has a shape approximating a shape of an upstream face of the first disk; and
the flow guide is between inboard and outboard seals.

23. The engine of claim 21 wherein:
the flow guide is securely attached to a static structure at one of an inboard end of the flow guide and an outboard end of the flow guide; and
at the other of the inboard end of the flow guide and the outboard end of the flow guide, the flow guide is either:
securely attached to said static structure; or
slip joint coupled to said static structure.

24. The engine of claim 18 wherein:
the means comprises a non-structural annular flow guide mounted to static structure at inboard and outboard portions.

25. The engine of claim 18 wherein:
the means comprises an annular, generally C-sectioned, flow guide.

26. The engine of claim 18 wherein:
the means comprises first and second annular flow guides respectively inboard and outboard of the outlet.

27. A gas turbine engine comprising:
a turbine rotor stack comprising:
   a plurality of disks; and
   a plurality of stages of blades, each stage carried by an associated disk of the plurality of disks;
a plurality of stator vane stages, interspersed with the blade stages;
a cover plate mounted to an upstream side of a first disk of the plurality of disks; and
a cooling air outlet positioned to direct cooling air to a region adjacent the first disk, wherein:
the first disk has a perimeter array of slots;
the blades of a first blade stage of the plurality of stages of blades each have an inboard attachment portion received in an associated slot of the slots;
the cover plate has first portion engaging the first disk to retain the cover plate against movement away from the first disk;
the cover plate has a second portion, outboard of the first portion and engaging the blades of the first blade stage to resist upstream movement of said blades;
the cover plate has a sealing portion for engaging a seal element inboard of a first stator vane stage of said plurality of stator vane stages;
a flow guide extends between the cooling air outlet and an inboard seal with the rotor;
the cover plate has radial span between an inner radius and perimeter radius; and
a first ratio of said radial span to a hub radius at the first blade stage is no more than 0.25;
the cooling air outlet has a characteristic radius from a central longitudinal axis of the rotor stack; and
a second ratio of said characteristic radius to said hub radius at the first blade stage is no less than 0.60.

28. The engine of claim 27 wherein:
the blades of the first blade stage have cooling passageways positioned to receive at least a portion of the cooling air.

29. The engine of claim 27 wherein:
the first ratio is no more than 0.20; and, the second ratio is no less than 0.70.

30. A turbine engine section comprising:
a stationary vane stage;
a rotating blade stage, said blade stage spaced from said vane stage to form an annular chamber therebetween;
a manifold for delivering a pressurized fluid to the chamber;
an outer diameter sealing means for restricting leakage of the pressurized fluid from said chamber;
an inner diameter sealing means for restricting leakage of the pressurized fluid from said chamber, the inner diameter sealing means comprising an abradable seal material carried by a seal carrier, the seal carrier extending aftward and radially inward from a forward portion comprising a flange bolted to the manifold to a rear portion carrying the inner diameter sealing means; and
a flow guide of generally forwardly open, C-shaped section extending radially between said inner diameter sealing means and said manifold, said flow guide bisecting said chamber to form a stationary chamber portion and a rotating chamber portion, the rotating chamber portion at least partially along a disk of the first blade stage, said flow guide mounted to said seal carrier.

31. A turbine engine section comprising:
a stationary vane stage;
a rotating blade stage, said blade stage spaced from said vane stage to form an annular chamber therebetween;
a manifold for delivering a pressurized fluid to the chamber;
an outer diameter sealing means for restricting leakage of the pressurized fluid from said chamber;
an inner diameter sealing means for restricting leakage of the pressurized fluid from said chamber, the inner diameter sealing means comprising an abradable seal material carried by a seal carrier; and
a flow guide of generally forwardly open, C-shaped section extending radially between said inner diameter sealing means and said manifold, said flow guide bisecting said chamber to form a stationary chamber portion and a rotating chamber portion, the stationary chamber portion not bounded by a rotor of the engine associated with the rotating blade stage, the rotating chamber portion at least partially along a disk of the first blade stage, said flow guide mounted to said seal carrier and generally closing off the stationary chamber portion so that the surfaces bounding the stationary chamber portion are essentially non-rotating with the stationary chamber portion bounded by the manifold forward and outboard of the stationary chamber portion, the flow guide aft of the stationary chamber portion, and the seal carrier forward and inboard of the stationary chamber portion.

* * * * *